(No Model.)
H. C. ROOME.
ELECTRIC BURGLAR ALARM.
No. 247,413. Patented Sept. 20, 1881.
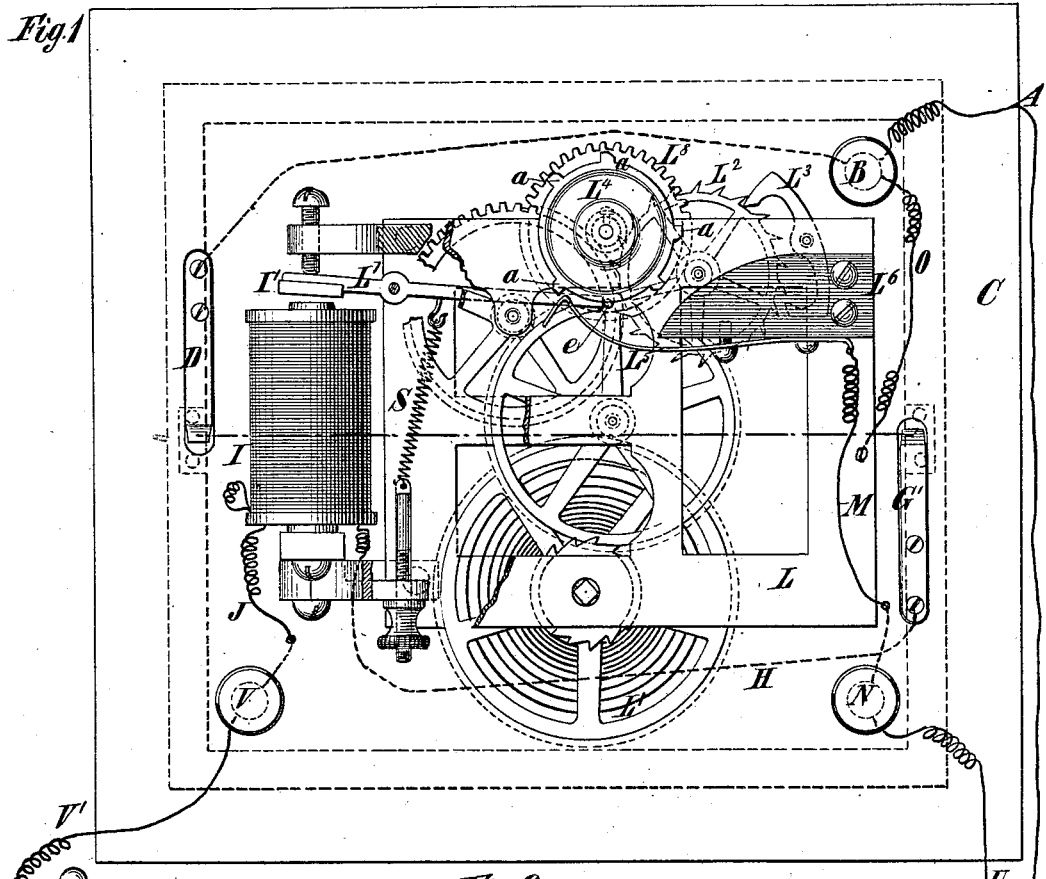
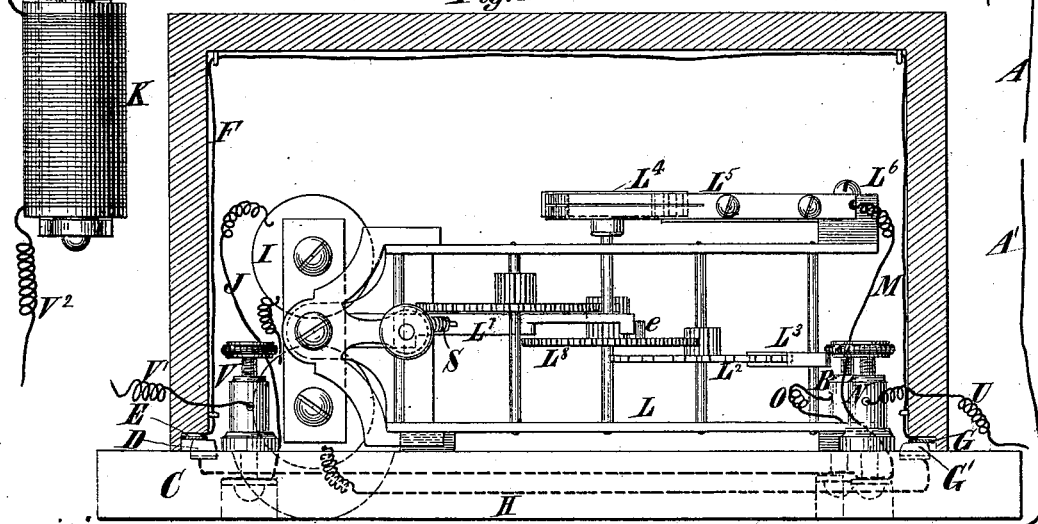
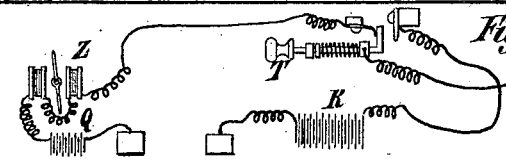

UNITED STATES PATENT OFFICE.

HENRY C. ROOME, OF JERSEY CITY, NEW JERSEY.

ELECTRIC BURGLAR-ALARM.

SPECIFICATION forming part of Letters Patent No. 247,413, dated September 20, 1881.

Application filed February 26, 1881. (No model.)

*To all whom it may concern:*

Be it known that I, HENRY C. ROOME, of Jersey City, in the county of Hudson and State of New Jersey, have invented certain new and useful Improvements in Electric Burglar-Alarms, of which the following is a specification.

My improvements relate to electric burglar-alarms in which buildings or other structures are connected with an office where a watch is kept; and the object of the improvements is to provide a simple and effective means whereby the watchman at the said office may, whenever he desires, ascertain whether the electric circuit to and in the structure to be guarded is all right or has been transferred or tampered with.

The improvements consist in the combination, in an electric burglar-alarm, of an instrument located in a structure to be guarded and adapted to be released by a watchman at the office where watch is kept, so that it will operate and transmit back a signal. Preferably the release of this instrument is effected through an electro-magnet and appurtenances, and this electro-magnet is actuated by augmentation of the force of the electric current flowing through the electric circuit in the structure to be guarded. The instrument employed to give the signal may consist of a train of wheels released by an electro-magnet and comprising a wheel or device which closes a short circuit when the instrument is running, and thereby transmits a signal from the structure to be guarded to the office.

In the accompanying drawings, Figure 1 is a diagrammatic view of a portion of an electric circuit in a structure to be guarded, a face view of an instrument included in said circuit, with portions of the frame broken away, and a diagrammatic view of a portion of the electric circuit at the office where a watchman or watchmen are kept; and Fig. 2 is an end view of the said instrument with the motive-spring omitted, and a transverse section of its box or case.

Similar letters of reference designate corresponding parts in both figures.

I do not deem it necessary to show in the drawings or to describe the whole of the electric circuit in the structure to be guarded, but deem it sufficient to say that it may be extended in the ordinary or any other suitable manner to include all doors, windows, safes, vaults, and other articles which it is desired to protect; neither do I consider it requisite to show or describe the electric circuit at the office, for that may also be of the ordinary or any other suitable form.

The line or wire A is supposed to be part of an electric circuit located in a structure to be guarded, and as connected with and passing from a safe or vault which is protected by a system of wires. This wire A is connected to a binding-screw, B, which, as here shown, is mounted on the base-board C of an instrument, L, whereby signals may, whenever desired, be obtained by a watchman at the office from the structure to be guarded while the electric circuit therein is all right, so that he may, by the aid of this instrument, ascertain whether the circuit in said structure is or is not all right. From the base of this binding-screw B this electric circuit extends through a wire arranged on the back of the said base-board C, and indicated in Fig. 1 by a dotted line, to a spring-finger, D, arranged on the face of the said base-board. Thence the electric circuit extends to a metal plate, E, on the box or case of the said instrument L, from it to a wire, F, arranged inside said box or case, and shown in Fig. 2, and thence to a metal plate, G, at the opposite side of this box or case and finger G'. From this finger G' it extends to and along a wire, H, arranged on the back of the base-board C of the said instrument, (shown by a dotted line in Fig. 1,) to the wire of an electro-magnet, I, comprised in said instrument. From the wire of this electro-magnet the circuit extends to a wire, J, to a binding-screw, V, and thence by a wire, V', to a resistance-coil, K. It passes through the resistance-coil to a return or ground wire, V².

The electric circuit which I have described is the normal electric circuit in the structure to be guarded, and a current of electricity is kept flowing constantly through, and during the entire time the structure is being guarded.

The instrument L consists, essentially, of a train of gear-wheels deriving motion from a convolute spring, L', which is combined with a ratchet-wheel and pawls, so that it may be wound up like the spring of a clock without disturbing the train of wheels. This train of wheels, as here shown, is provided with an escapement consisting of an escapement-wheel, L², and a detent, L³, to prevent too rapid movement of the train of wheels. In lieu of this escapement, any other suitable escapement may be used, or a fan may be employed.

L⁴ is what I term a "short-circuiting wheel," carried by the shaft or arbor in the train of wheels whereby motion is imparted to the shaft or arbor carrying the escapement-wheel L². It is provided with radial projections $a$, here shown as grouped so that two are close together, and two others at a considerable distance are close together, and one is located at a considerable distance from the last pair. This particular wheel is designed to give the signal "221" to the watchman at the office; but a different wheel, adapted to give a different signal from each structure to be guarded, will preferably be used on the various instruments which are arranged in the said structures.

The advantage of such different signals lies in the fact that if a burglar discovers what signal any particular instrument is adapted to give, he is not thereby apprised as to what signals the other instruments give. Of course it is intended that the watchman at the station or office shall operate only one of these instruments at a time.

L⁵ designates what I term a "short-circuiting metallic spring-finger," with which projections $a$ of the short-circuiting wheel L⁴ come in contact when the said wheel rotates.

The frame of the instrument L is of metal, and its entire train of gear-wheels are of metal also; but the short-circuiting finger L⁵ is insulated from the frame of the instrument by being attached to a block of insulating material, L⁶, which is mounted on the frame of said instrument. The short-circuiting finger L⁵ is connected by a wire, M, extending through and partly along the back of the base-board C of the instrument, to a binding-screw, N, and this wire, where it is in proximity to the frame of the instrument, is insulated by a flexible india-rubber tube. The binding-screw N has connected to it a return or ground wire, U, which is independent of the normal circuit previously described.

The instrument L is, as I have before intimated, only designed to run when a watchman at the office desires to ascertain whether the electric circuit at the structure to be guarded where it is located is all right. It is therefore provided with a stop device, which may be released by a watchman at the office. The stop device here shown consists of a lever, L⁷, which is pivoted in the frame of the instrument, and is adapted to obtrude itself in the way of a pin, $e$, carried by a wheel, L⁸, which is mounted on the same shaft or arbor as the short-circuiting wheel L⁴. The end of this lever which is adjacent to the wheel L⁸ is impelled by a spring, S, in a direction away from the axis of this wheel; hence, when the lever is not otherwise actuated it will obtrude itself in the way of the pin $e$ and stop the instrument from operating or running. At the other end of the lever is an armature, I', for the electro-magnet I.

From the binding-screw B, to which the line or wire A is connected, there also extends along the back of the base-piece C of the instrument a wire, O, (shown in Fig. 1,) to the frame of the instrument.

A' designates the part of the line or wire A which is at the office, and Q designates a battery, by which is generated the electric current which flows through the electric circuit in the structure to be guarded.

R designates a battery, which, by means of a switch, T, at the office, may be connected to the line or wire A A', so that the potential of the current flowing through the electric circuit in the structure to be guarded will be increased.

The battery Q does not generate an electric current of sufficient power to magnetize the electro-magnet I enough to attract the armature I' and release the instrument L; but when the battery R is switched into the line or wire A A' to increase the potential of the electric current the electro-magnet attracts the armature and releases the instrument. The instrument then starts running, and whenever one of the radial projections $a$ of the short-circuiting wheel L⁴ comes in contact with the short-circuiting finger L⁵, the electric current passes from the binding-screw B to the frame of the instrument, thence through the short-circuiting wheel to the short-circuiting finger, and thence to the wire M and binding-screw N, to the independent return or ground wire U. Thus the resistance-coil K and the electro-magnet I are short-circuited out of the circuit every time contact is made between one of the projections $a$ of the short-circuiting wheel L⁴ and the short-circuiting finger L⁵, and a signal is sent to the watchman at the office. If the watchman fails to get the signal, he is apprised that the electric circuit at the structure to be guarded is not all right. Of course the battery R is only left for an instant in circuit with the line or wire A A'; hence the armature I', as soon as it has freed the instrument, is released by the electro-magnet I and the lever L⁷ resumes its normal position, engages with the pin $e$ on the wheel L⁸, and stops the instrument. The instrument stops with the projections $a$ of the short-circuiting wheel out of contact with the short-circuiting finger.

It will be seen that by my invention I provide a very simple and effective means for ascertaining whether the electric circuit through a structure to be guarded and between it and the office is all right, or whether it has been tampered with or transferred.

The instrument here shown for giving the signals at the station or office consists of a galvanometer, Z.

What I claim as my invention, and desire to secure by Letters Patent, is—

1. The combination, in an electric burglar-alarm, of an instrument located in a structure to be guarded, and adapted to be released by a watchman at the office where watch is kept, to cause a signal to be given at the office, substantially as specified.

2. The combination, in an electric burglar-alarm, of an instrument located in a structure to be guarded, and adapted to cause a signal to be given at the office where watch is kept, an electro-magnet, and an electric circuit extending to the office, and through which said magnet may be caused to effect the release of said instrument, substantially as specified.

3. The combination, in an electric burglar-alarm, of an instrument located in a structure to be guarded, adapted to cause a signal to be given at the office where watch is kept, and having an electro-magnet, whereby it may be started, a battery or source of electricity for the structure to be guarded, and another battery or source of electricity whereby the potential of the electric current flowing through the electric circuit in the structure to be guarded may be increased at the office, to cause the electro-magnet to release the instrument, substantially as specified.

4. The combination, in an electric burglar-alarm, of an instrument located in a structure to be guarded, and comprising a train of wheels, a short-circuiting wheel and finger, and an electro-magnet for releasing it, an electric circuit extending to the office where watch is kept, and means whereby a sufficient current of electricity may be sent from the office to said electro-magnet to cause the latter to release said instrument and allow it, through the short-circuiting wheel and finger, to cause a signal to be given at the office, substantially as specified.

HENRY C. ROOME.

Witnesses:
H. F. NEWBURY,
T. J. KEANE.